(12) United States Patent
Meier

(10) Patent No.: US 7,957,275 B2
(45) Date of Patent: Jun. 7, 2011

(54) QUEUING SYSTEM

(75) Inventor: Karl Meier, Wellesley, MA (US)

(73) Assignee: Jinsalas Solutions, LLC, Dover, DE (US)

( * ) Notice: Subject to any disclaimer, the term of this patent is extended or adjusted under 35 U.S.C. 154(b) by 1058 days.

(21) Appl. No.: 10/937,662

(22) Filed: Sep. 9, 2004

(65) Prior Publication Data

US 2006/0050691 A1 Mar. 9, 2006

(51) Int. Cl.
*H04L 12/26* (2006.01)
*H04L 12/54* (2006.01)
*H04L 12/56* (2006.01)

(52) U.S. Cl. ......... 370/230; 370/412; 370/413; 370/379

(58) Field of Classification Search ................. 370/228, 370/360, 389, 401, 411, 412, 413, 416, 230, 370/232, 355, 380, 236, 402, 428, 235, 417; 709/226, 249

See application file for complete search history.

(56) References Cited

U.S. PATENT DOCUMENTS

| | | | | |
|---|---|---|---|---|
| 5,172,371 A | * | 12/1992 | Eng et al. | 370/411 |
| 5,291,482 A | * | 3/1994 | McHarg et al. | 370/413 |
| 5,689,505 A | * | 11/1997 | Chiussi et al. | 370/388 |
| 5,737,525 A | * | 4/1998 | Picazo et al. | 709/249 |
| 5,864,539 A | * | 1/1999 | Yin | 370/236 |
| 5,905,725 A | * | 5/1999 | Sindhu et al. | 370/389 |
| 5,991,297 A | * | 11/1999 | Palnati et al. | 370/389 |
| 6,055,234 A | * | 4/2000 | Aramaki | 370/395.72 |
| 6,157,644 A | * | 12/2000 | Bernstein et al. | 370/392 |
| 6,219,728 B1 | * | 4/2001 | Yin | 710/52 |
| 6,449,647 B1 | * | 9/2002 | Colby et al. | 709/226 |
| 6,466,590 B1 | * | 10/2002 | Park et al. | 370/535 |
| 6,510,138 B1 | | 1/2003 | Pannell | |
| 6,598,132 B2 | | 7/2003 | Tran et al. | |
| 6,721,273 B1 | * | 4/2004 | Lyon | 370/235 |
| 6,771,601 B1 | | 8/2004 | Aydemir et al. | |
| 6,791,947 B2 | * | 9/2004 | Oskouy et al. | 370/238 |
| 6,813,274 B1 | * | 11/2004 | Suzuki et al. | 370/412 |
| 6,963,576 B1 | * | 11/2005 | Lee | 370/411 |
| 7,058,751 B2 | * | 6/2006 | Kawarai et al. | 710/317 |
| 7,184,444 B2 | * | 2/2007 | Posey, Jr. | 370/416 |
| 7,289,498 B2 | * | 10/2007 | Yu et al. | 370/389 |
| 7,460,528 B1 | * | 12/2008 | Chamdani et al. | 370/381 |
| 2002/0054602 A1 | * | 5/2002 | Takahashi et al. | 370/412 |
| 2002/0099900 A1 | * | 7/2002 | Kawarai et al. | 710/317 |
| 2002/0110139 A1 | * | 8/2002 | Boura et al. | 370/432 |

OTHER PUBLICATIONS

Chuang, et al., "Matching Output Queueing with a Combined Input Output Queued Switch," Department of Electrical Engineering, Stanford Unviersity, 1999, 17 pages.

* cited by examiner

*Primary Examiner* — William Trost, IV
*Assistant Examiner* — Emmanuel Maglo

(57) ABSTRACT

An improved architecture for switches and a method for transmitting data with the switching are disclosed. An increased amount of memory is utilized, operating at speeds lower than are required by Input Queued switches, and a simple scheduling algorithm. The architecture divides the input ports into groups, where each input port group has an associated set of memory elements. Incoming packets are routed to the appropriate element in the set of memory elements. The number of groups and the number of ports that are included in each group can be varied, allowing the architecture to be modified based on the system architecture, the semiconductor technology, and other design considerations.

26 Claims, 4 Drawing Sheets

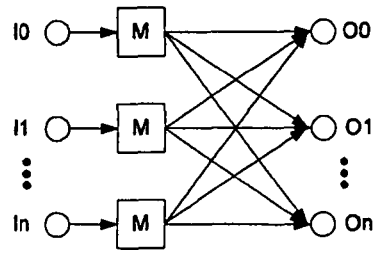
Figure 1. A Non-Blocking Input Queued Switch
PRIOR ART
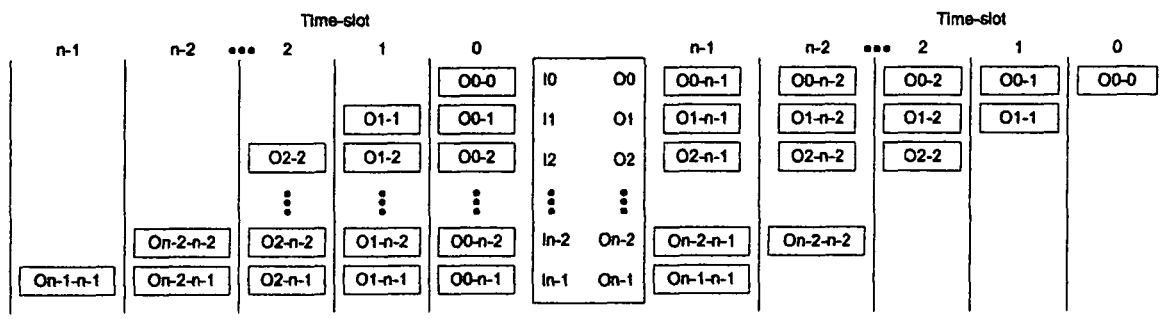
Figure 2.
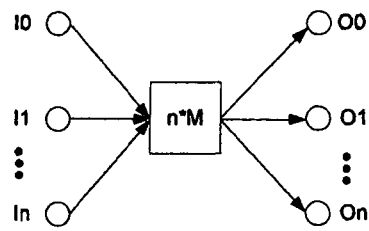
Figure 3. A Non-Blocking Output Queued Switch with Central Memory
PRIOR ART

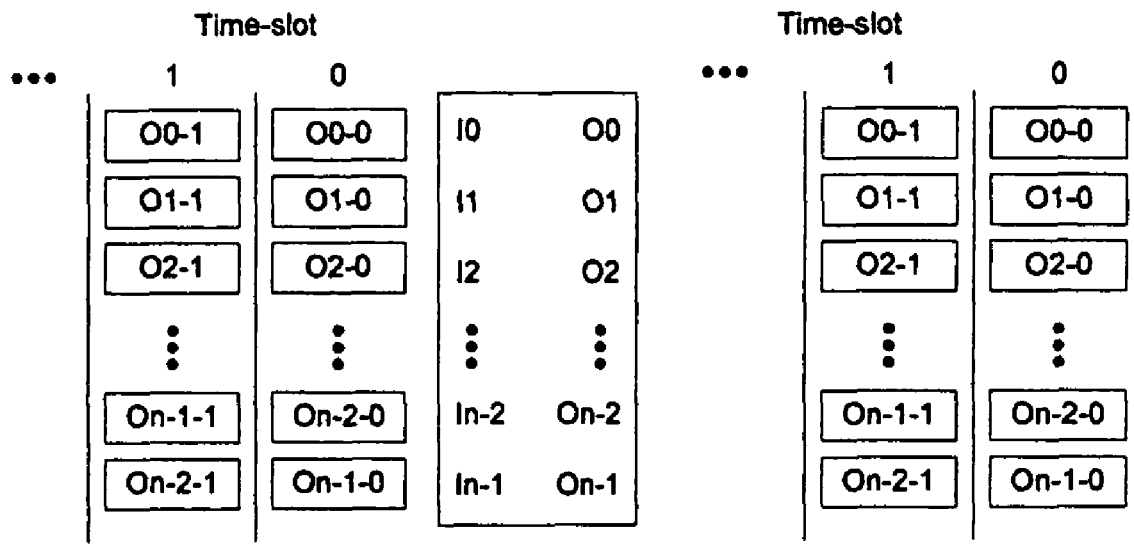
Figure 4.
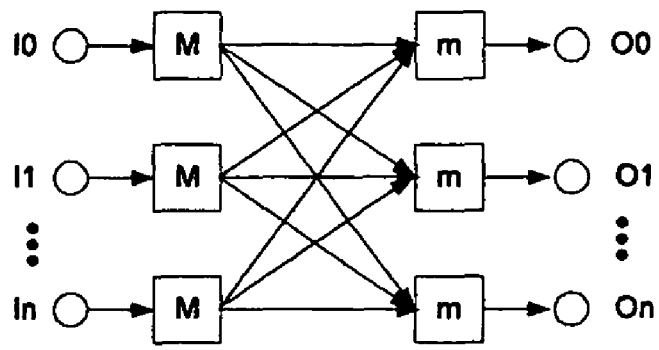
Figure 5. A Combined Input-Output Queued Switch
PRIOR ART

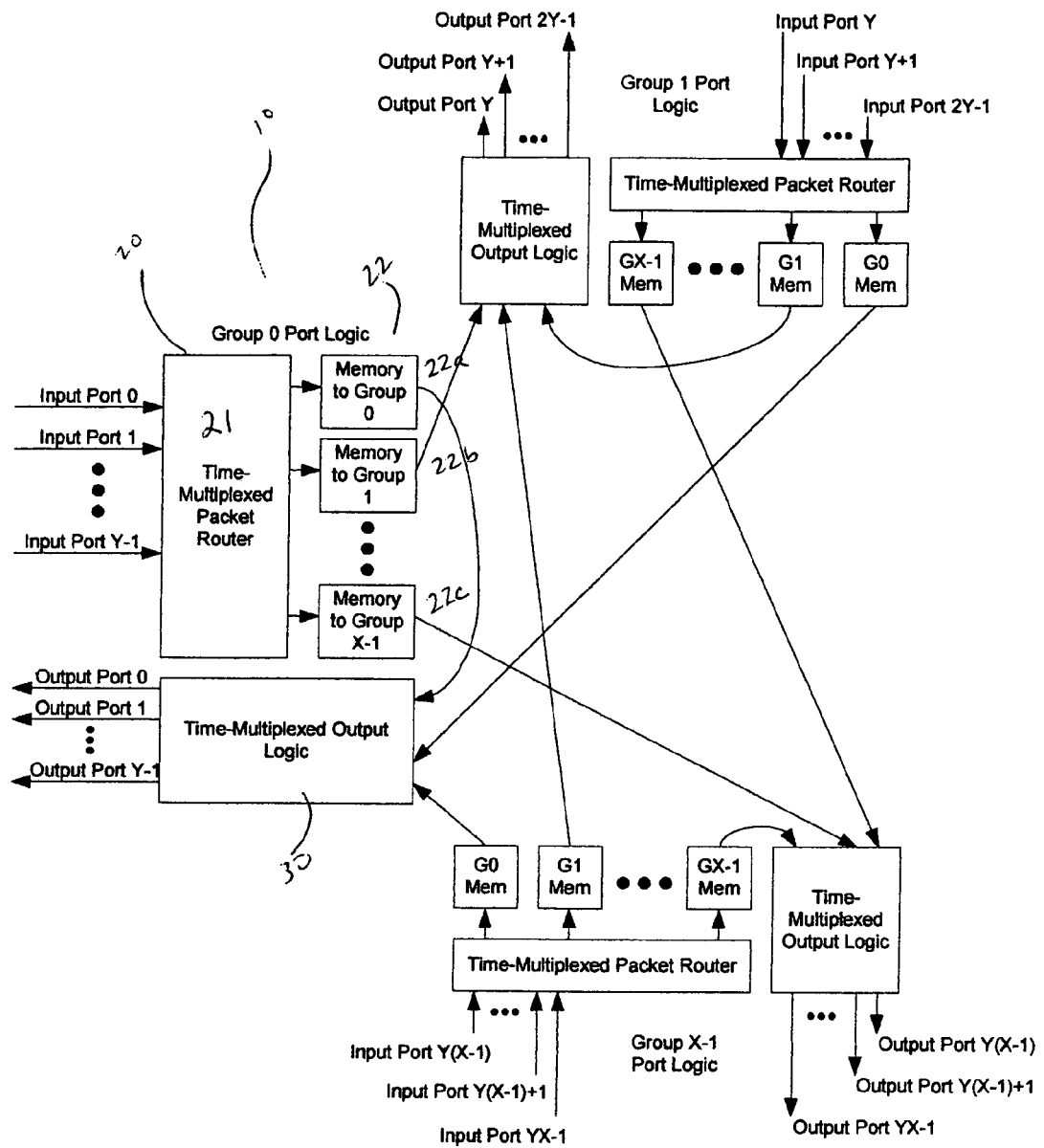
Figure 6. Detailed View of the Input-Group Queued Switch

QUEUING SYSTEM

BACKGROUND OF THE INVENTION

In computer networks, information is constantly being moved from a source to a destination, typically in the form of packets. In the simplest situations, the source and destination are directly connected and the packet of information passes from the source to the destination, without any intermediate stages. However, in most networks, there are at least one, if not multiple, intermediate stages between the source and the destination. In order for the information to move from the source to the destination, it must be routed through a set of devices that accept the packet and pass it along a predetermined path toward the destination. These devices, referred to generically as switches, are typically configured to accept packets from some number of input ports and transmit that information to an output port, which was selected from a plurality of ports. Often, ports are capable of both receiving and transmitting, such that the input and output ports are the same physical entities.

In an ideal network, traffic arrives at an input port of a switch. The switch determines the appropriate destination for the packet and immediately transmits it to the correct output port. In such a network, there is no need for storing the packet of information inside the switch, since the switch is able to transmit the packet as soon as it receives it.

However, because of a number of factors, this ideal behavior is not realizable. For instance, if the switch receives packets on several of its input ports destined for the same output port, the switch must store the information internally, since it cannot transmit all of these different packets of information simultaneously to the same output port. In this case, the output port is said to be "congested". This term also describes the situation in which the device to which this output port is connected is unable to receive or process packets at the rate at which they arrive for some reason. In such a case, the switch must store the packet destined for that output port internally until either the offending device is able to receive more information or the packet is discarded.

While it is possible that external factors may cause a switch to store packets rather than transmitting them immediately, it is a design goal of nearly all switches that they are able to process packets at the rate at which they are received. The speed at which packets are received, also known as line rate, is a critical parameter in the design of the switch.

Switches typically have a set of inputs, or input ports, where data enters the device. Similarly, switches also have a set of outputs, or output ports, whereby data exits the device. In many implementations, an input port and an output port will share a common physical connection, at the point where the device interfaces with other components. This point is typically the device's interface with the other components, and can be a lead or pin exiting the device, or an internal interconnect within a larger device, of which this specific switch is only a subset. Thus, in many implementations, the number of output ports and the number of input ports will be identical.

The design goal for a switch is that data can exit the output ports at the same rate as it entered the input ports, although it may be somewhat delayed. Several mechanisms have been developed to meet this requirement.

One such mechanism, known as input queuing is shown in FIG. 1. Input ports, $I_0$ through $I_{n-1}$, are each associated with a memory element, $M_0$ through $M_{n-1}$. Each memory element receives input data only from its associated input port. In addition to the input ports, each switch has a set of output ports. Typically, the number of input ports and output ports are identical, although this is not a requirement. The data received by any input port can be destined for any of the N output ports in the switch, thus connections between each memory element and each output port are shown.

In the worst case scenario, shown in FIG. 2, each input port receives data, in the form of a packet, destined for port $O_0$ during the first time slot. Each packet is labeled with its destination output port, followed by the time slot during which it is to be transmitted. In the next time slot, each port, except $I_0$ receives a packet for port $O_1$. This pattern continues, so that in time slot N, only port $I_{n-1}$, receives a packet destined for port $O_{n-1}$.

In a non-blocking, ideal switch, the switch should be able to deliver the packets to the output ports in the minimum time period. As shown in FIG. 2, in time slot 0, output port $O_0$ transmits its first packet. Since no packets have arrived yet for any other output ports, the other output ports remain idle. During the next time slot, the packets that arrived at input port $I_1$ that are destined for output ports $O_0$ and $O_1$ are both sent. This process continues and in the general case, during time slot k, all packets that arrived at input port $I_k$ up to that point are all transmitted simultaneously on output ports $O_0$ through $O_k$. Therefore, memory element $M_k$ must be able to supply data at full line rate to k output ports during a single time slot. In order to achieve this result, it follows that memory element $M_k$ must run at a speed of k multiplied by the line rate. Thus, for a switch with N input ports, the memory elements must be able to supply data at N times the line rate of the switch. Since each memory element must also be able to receive a new incoming packet while transmitting to all output ports simultaneously, each memory element must run at a speed of at least (N+1) multiplied by the line rate.

A second consideration in the design of a switch is the amount of memory that is consumed. The amount of memory at each input port must be at least equal to the amount of buffering that is communicated to the neighboring switch. In the above example, if each input port had communicated that an amount of memory, M, was available, then the total memory in the switch can be expressed as N multiplied by M, where N is the number of input ports and M is the amount of memory at each input port.

A third consideration in the design of a switch is the complexity of scheduling the transmission of packets. The receipt of packets is achieved by having sufficient memory available at the input port. The transmission of packets to their respective output ports is most typically done through the use of a high speed scheduler, which typically uses a time multiplexing scheme to allocate a slice of each time slot to each output port in sequence. Although running at high speed, the scheduling algorithm is very simple and straightforward. This minimizes the time to design and verify its operation, which is often a key consideration in the design of new devices.

The first line of Table 1 illustrates the memory size and speed characteristics associated with a 12 port switch using an input queued structure.

TABLE 1

| Type of Switch | Memory Size | Memory Speed |
|---|---|---|
| Input Queued | 12*M | 13 * line rate |
| Central Memory | 12*M | 24 * line rate |
| CIOQ | 18*M | 3 * line rate |

A second mechanism, using a centralized memory structure, can also be used to implement a switch. This mechanism, known as an output port queued switch with a centralized memory is shown in FIG. 3. In this implementation, rather than having separate memories as with input port queues, a single large memory is used. All of the input and output ports communicate with this centralized memory.

Referring to FIG. 4, it can be seen that there are scenarios in which each of the N input ports and each of the N output ports must be able to communicate simultaneously with the memory in order for it to operate in its most efficient manner. In the first time slot, each input port receives a packet destined for a different output port, scheduled for delivery in that time slot. To achieve this result, the memory must be able to complete all of these operations in a single time slot. In other words, the memory must operate at the line rate, multiplied by the total number of ports. Thus, the memory must operate at a speed of at least 2*N multiplied by the line rate of the incoming data, assuming that the number of output ports is the same as the number of input ports.

Since all N of the input ports must communicate with the single centralized memory, that memory must be large enough to accommodate the sum of amount of buffering that each input port has communicated to the neighboring switch. In this example, if each input port had communicated that an amount of memory M, was available, then the total memory in the switch can be expressed as N multiplied by M, where N is the number of input ports and M is the amount of memory at each input port.

The design of the scheduler is roughly equivalent to that of the input queued switch described above, where the scheduling uses a time multiplexing scheme to allocate a portion of each time slot to each output port.

The second line of Table 1 illustrates the memory size and speed characteristics associated with a 12 port switch using a output queued structure with a centralized memory.

Using current technologies, it is typically more feasible to include additional memory within a semiconductor device than it is to increase the speed of that memory. Consequently, much effort has been expended in both the intellectual and commercial pursuit of switches that can operate at lower memory speeds, even at the expense of adding memory elements.

One such implementation is known as combined Input-Output Queued (CIOQ) switch, as shown in FIG. 5. In this structure, a memory element is associated with each input port, as is done in the input queued switch. However, an additional memory element is associated with each output port as well. This additional memory element at each output port allows data to be moved from the input queues to the output queues, not only when it is being transmitted, but also during idle times. This alleviates the very high bandwidth requirements associated with the input queued switch.

Referring back to FIG. 2, the worst case traffic pattern for an input queued switch is also the worst case pattern for a CIOQ switch. Numerous research papers, such as Matching Output Queueing with a Combined Input Output Queued Switch, which was published by Stanford University and presented at Infocom '99, and is hereby incorporated by reference, have shown that a CIOQ switch can properly emulate a input queued switch for a broad class of scheduling algorithms if the transfers between the input queues and the output queues are performed at twice the line rate. Thus, the memory elements with a CIOQ switch need only operate at three times the line rate, to account for the two times line rate internal transmissions plus the external line rate transmission. This structure produces a much lower memory speed requirement than either of the other prior art approaches, especially as the number of ports increases.

To implement this structure requires memory elements associated with each input port and memory elements associated with each output port. As described earlier, the amount of memory at each input port is related to the available buffering that the port has communicated to the neighboring switch. The memory elements associated with the output ports are used to hold packets before being transmitted via the output port. These elements typically do not need to be as large as those associated with the input ports, and preferably are roughly half as large. Therefore, the amount of memory needed for the memory elements associated with the input ports, as before, is N multiplied by M, while the amount of memory associated with the output ports is N multiplied by M/2. This results in a total memory size of 1.5*N*M.

The third line of Table 1 illustrates the memory size and speed characteristics associated with a 12 port switch using a combined input output queued structure.

The CIOQ significantly reduces the required speed of the memory in exchange for a modest increase in the amount of memory. Based on current semiconductor technologies, this would appear to be the proper tradeoff. However, the CIOQ is not without significant drawbacks.

In order to achieve the benefits highlighted above, a complex scheduling algorithm is required. In fact, the previously cited Stanford paper states that the significant reduction in memory bandwidth comes at the expense of the scheduling algorithm. It further states that the algorithms proposed in the paper are not suitable for high port count switches. Other algorithms are possible; however, it requires significant development and testing time to verify that the scheduling algorithm works correctly under all types of traffic patterns and conditions. Mistakes in the algorithm will cause the switch to not forward packets efficiently, leading to potential network performance degradation. Furthermore, the development and testing of such a complex scheduling algorithm is a time consuming process, which could adversely affect the ability to bring the switch to market in a timely manner. Complex algorithms are also very difficult to implement in silicon. The scheduling algorithm must be designed to operate at a sufficiently high speed so as to keep up with the switching rate of the memories. As the algorithm becomes more complex and more steps are added, it becomes increasingly difficult to meet the required time constraints for the scheduling circuitry. It can then require significant development time to find the proper trade-offs between scheduling complexity, performance, and speed. These issues counteract the benefits in memory bandwidth described earlier, making the CIOQ switch less desirable.

Several trends in integrated semiconductor circuit design and overall system design give rise to the need for a new type of switch architecture. First, the line rate between switches continues to increase at a faster rate than the speed of the memory elements within the integrated circuits, Thus, it is becoming more and more difficult to develop input queued switches with the required memory bandwidth. Second, the number of ports on each switch continues to increase, putting further pressure on the memory bandwidth. Third, as semiconductor geometries continue to shrink, many integrated circuit (IC) designs are now pad-limited. This means that the size of the die is determined by the number of bonding pads that are required and not by the size of the logic within the IC. Therefore, the amount of logic within the chip can grow without affecting its cost, since the die size remains unchanged. Fourth, although logic and memory elements can be added without a monetary cost, there are hidden costs. For example, as memories increase in size, they decrease in speed. However, this relationship is not proportional; a increase of 100% in memory size will result in a memory speed decrease of about 10-20%. Also, the addition of more logic, specifically complex scheduling logic, can significantly impact the time it takes to develop and fully test a new switching IC. Furthermore, it is also difficult to run large complicated logic at very high speed due to the irregularities of layout and routing.

Based on these trends, several conclusions can be drawn. The first is that increasing the amount of memory to an IC generally is less expensive in terms of cost and time than increasing the speed of those memories. The second conclusion is that complicated, time-critical logic increases the risk of failure and the development time, and should be avoided as much as is possible.

SUMMARY OF THE INVENTION

The problems with the prior art have been overcome with this invention, which provides an improved architecture for switches. The current trends in semiconductor design suggest that increasing the amount of memory within an integrated circuit is less costly than increasing the speed of that memory. It is also well known that complex, high speed logic can present difficulties in terms of design and testing, which can adversely affect the timely delivery and quality of new switches. The present invention utilizes an increased amount of memory, operating at speeds lower than are required by Input Queued switches, and a simple scheduling algorithm. The architecture of the present invention divides the input ports into groups, where each input port group has an associated set of memory elements. Incoming packets are routed to the appropriate element in the set of memory elements. The number of groups and the number of ports that are included in each group can be varied, allowing the architecture to be modified based on the system architecture, the semiconductor technology, and other design considerations.

BRIEF DESCRIPTION OF THE DRAWINGS

FIG. 1 illustrates a typical topology for a non-blocking input queued switch;

FIG. 2 illustrates the worst case traffic pattern for the switch of FIG. 1;

FIG. 3 illustrates a typical topology for a non-blocking output queued switch with a central memory;

FIG. 4 illustrates the worst case traffic pattern for the switch of FIG. 3;

FIG. 5 illustrates a typical topology for a combined input-output queued (CIOG) switch;

FIG. 6 illustrates the topology of the switching architecture in accordance with the present invention.

DETAILED DESCRIPTION OF THE INVENTION

Figure 7:
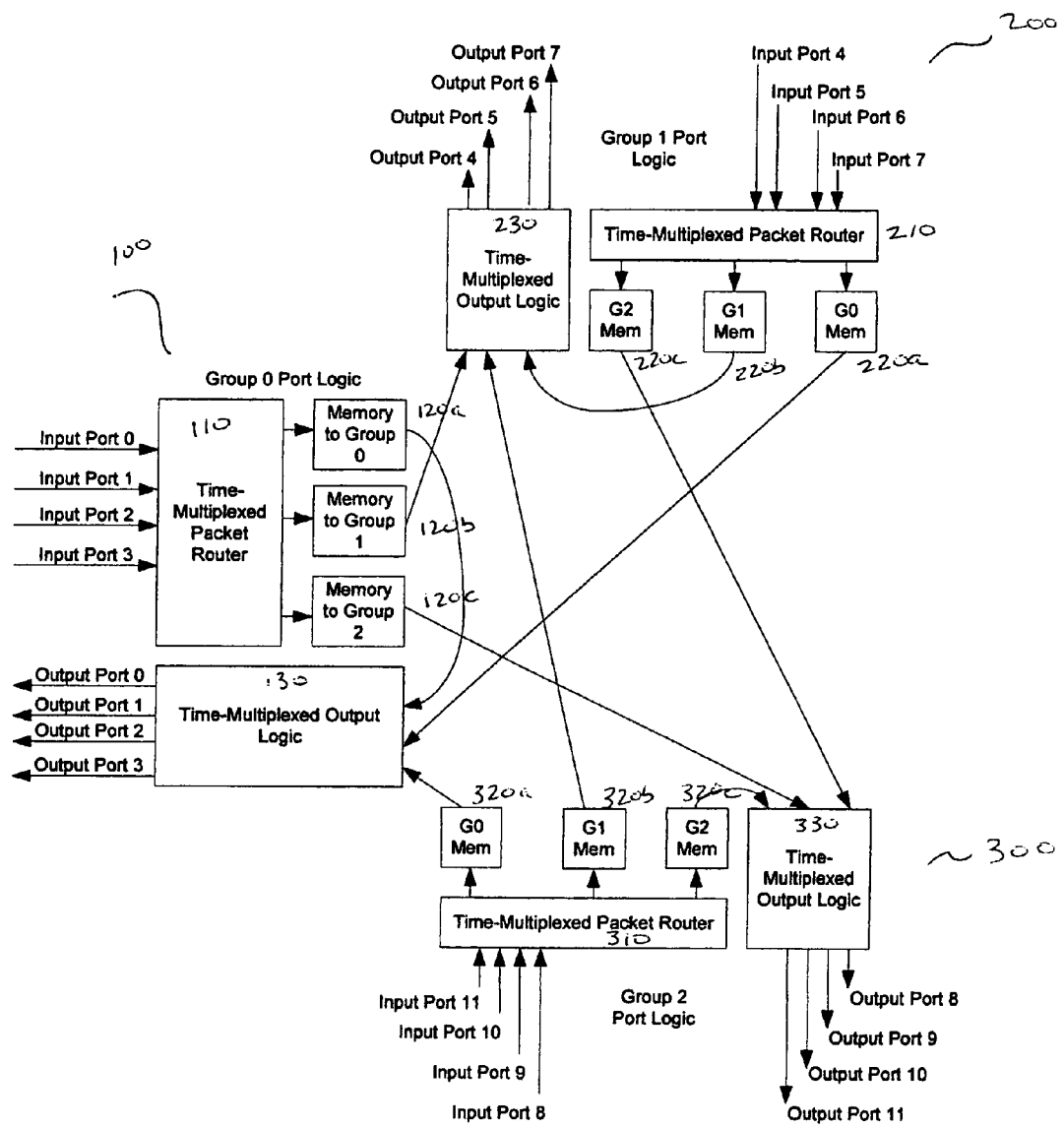
FIG. 7 illustrate a specific embodiment of a twelve port switch in accordance with the present invention.

Switches are used to logically connect a set of input ports to a set of output ports. Most typically, the number of input ports is identical to the number of output ports, although this is not a requirement. FIG. 6 shows the topology of a switch in accordance with the present invention. In this figure, the number of input ports and the number of output ports are identical, and are both represented by the expression:

X multiplied by Y, where the terms X and Y will be described in more detail below.

Referring again to FIG. 6, the port logic for group 0 is generally shown at 10. Group 0 is a subset of the total number of ports contained in the device. In this embodiment, there are a number of groups, where each group represents a subset of the total number of ports. These subsets are non-overlapping, such that the each port is contained in only one group. The port logic 10 comprises logic associated with the input ports 20 and logic associated with the output ports 30. In this embodiment, there are Y input ports and Y output ports associated with port logic 10. Although this description assumes that the number of input ports is the same as the number of output ports, and that the number of total ports in the device is not a prime number, the invention is not so limited. The architecture can also be employed when there are different numbers of input and output ports, and can be used for any number of ports.

In the preferred embodiment, there are X identical instances of the port logic incorporated in the switch, corresponding to X different groups of input and output ports. Thus, the total number of ports is expressed as Y ports/group multiplied by X groups, or X multiplied by Y. Although this is the preferred embodiment, each group need not be identically configured.

The operation of the switch will be described with respect to port logic 10. Packets from the first input port group arrive at the time multiplexed packet router 21. The router 21 preferably identifies the output port for which the packet is destined. Based on this information, it routes the packet to a specific memory element 22. Each memory element 22 is associated with a group, which is a set of output ports. In FIG. 6, output ports 0 through Y−1 are associated with group 0, output ports Y through 2*Y−1 are associated with group 1, etc., where Y is the number of output ports per group. Therefore, if the incoming packet was destined for output port 0, the router 21 would place the packet in the memory element associated with group 0 (22a). Similarly, if the packet were destined for output port X*Y−1, the router 21 would place the packet in memory element 22c.

To insure timely delivery and the absence of blocking, each memory element must utilize a mechanism to separately track packets destined for each output port in the output group. In the preferred embodiment, descriptors, such as linked lists, are used to track the contents of the memory element based on the specific output port. A linked list maintains the valid list of packets destined for each port. Optionally, additional lists can be used to track packets based on other network parameters, such as classes of service, or ordered only traffic vs. bypassable traffic (for deadlock avoidance). In the preferred embodiment, the packet router identifies the class of service, output port, and other relevant network parameters associated with the packet and communicates this information to the group memory so the packet can be stored in the correct linked list.

Alternatively, each memory element can be further divided into Y smaller memory elements, where each of these smaller memory elements contains packets destined for only one specific output port.

The storage capacity of each memory element 22 must be at least equal to the amount of buffering that is communicated to the neighboring switch, multiplied by the number of input ports in that group. In the above example, if each input port had communicated that an amount of memory, M, was available, then the total memory in each memory element can be expressed as Y multiplied by M, where Y is the number of input ports in the group and M is the amount of memory that each input port has communicated that it has available. This value is based on a worst case scenario, where all incoming packets on all input ports of the group are destined for the same output group. In that scenario, the memory element associated with that particular output group must be able to store all of those packets. Since there are X memory elements per group, the total memory per port logic 10 is given as:

Memory per port logic=X*Y*M.

Therefore, with a total of X groups within the switch, the total memory requirement is given by:

Total memory=X*X*Y*M, or X*N*M, where N is the number of input ports.

In the worst case scenario described above, a single memory element must be able to receive packets from all Y of the input ports simultaneously. Thus, the memory must receive data at Y multiplied by the line rate to effectively operate in this architecture.

Each group port logic 10 also comprises output logic 30. The output logic 30 is in communication with Y output ports, and is also in communication with the memory elements 22 located in the input logic 20 of the various groups. As described earlier, in the preferred embodiment, there are X memory elements 22 in communication with the output logic 30. The output logic must operate at a speed sufficient to allow all output ports to be transmitting simultaneously. Since there are Y output ports per group, the output logic must operate at Y multiplied by the line rate. Therefore, each memory element in communication with the output logic must be able to transmit data at that rate. Combining the receive and transmit requirements for the memory elements yields a total required speed of 2*Y, multiplied by the line rate, since the memory elements must be able to simultaneously receive and transmit data at the maximum rate.

In operation, the output logic 30 uses a time multiplexing algorithm to allocate one time slot per output port. As described earlier, each memory element utilizes a mechanism, preferably linked lists, so that the scheduler can identify and locate packets intended for each specific output port within the memory element. The scheduler, using any of a number of known algorithms, selects a packet from one of the memory elements associated with this output group and transmits that packet via the specific output port. The scheduler repeats this process for each output port in the group.

Thus, by using this architecture, the amount of memory required and the speed of that memory can be varied in accordance with various design considerations. Table 2 illustrates the potential implementations involving a switch with 12 input ports and 12 output ports in accordance with the present invention.

TABLE 2

| # of groups (X) | # of ports per group (Y) | Memory Size (* M) | Memory speed (* line rate) |
|---|---|---|---|
| 1 | 12 | 12 | 24 |
| 2 | 6 | 24 | 12 |
| 3 | 4 | 36 | 8 |
| 4 | 3 | 48 | 6 |
| 6 | 2 | 72 | 4 |
| 12 | 1 | 144 | 2 |

As can be seen in this table, it is possible to vary the memory requirements significantly. For example, an implementation where X equals 1, has the same memory size requirements as an input queued switch, however requires significantly higher speed memory elements. Conversely, an implementation where Y equals 1, requires significant memory space, but has a memory speed requirement which is lower than the Combined Input/Output Queued switch, without the complex scheduling logic. Furthermore, a balance between memory size and memory speed can be achieved by the appropriate selection of X and Y. For example, an implementation where X equals 4 results in a memory configuration which can operate at less than half the speed required for an input queued switch, while being only four times the size of the input queued switch. Referring back to the technology trends noted above, such a tradeoff may be advantageous in the design of the switch.

Referring to FIG. 7, a specific embodiment of FIG. 4 in which X is equal to 3 and Y is equal to 4 is shown. The group 0 port logic 100 is in communication with input ports 0 through 3, and output ports 0 through 3. Similarly, the group 1 port logic 200 is in communication with ports 4 through 7 and the group 2 port logic 300 is in communication with ports 8 through 11. The group 0 port logic 100 has three memory elements 120; each of which is associated with one of the three groups. The time-multiplexed packet router 110 receives packets arriving from input ports 0 through 3. It then determines which group of output ports it is destined for. For example, a packet destined for output port 8 will be placed in memory element 120c, while a packet destined for output port 2 will be placed in memory element 120a. The memory element then employs a mechanism enabling it to track the packets destined for each output port. For example, the memory element may employ four linked lists, one per output port, where it identifies the memory locations used for each output port. Alternatively, the memory element 120 can be subdivided into four smaller memory elements, where each of these smaller memories contains all of the packets for a particular output port.

Since the memory elements can potentially be receiving packets from all four input ports simultaneously, they must be able to receive data at a rate at least equal to four times the line rate. Similarly, the packet router 110 must operate at four times the line rate as well to deliver up to four packets simultaneously.

Since memory element 120a stores packets destined for output ports 0 through 3, its size must be equal to four times the size that it communicated to any port.

In a second embodiment, multicast packets, which are packets that are to be sent to multiple destinations, can be placed into a plurality of the memory elements 120. The router 110 would identify the packet as a multicast packet, identify the multicast group and place the incoming packet into the memory elements associated with each output port that is part of that multicast group. If the multicast packet is destined for several output ports within the same output group, the multicast packets can be inserted into several linked lists simultaneously without having to write the packet into the memory element multiple times.

Associated with group 0 port logic 100 is time-multiplexed output logic 130. The group 0 output logic 130 is in communication with output ports 0 through 3, while the group 1 output logic 230 is in communication with output ports 4 through 7 and group 2 output logic 330 is in communication with output ports 8 through 11. The group 0 output logic 130 is also in communication with the memory elements in each port logic that are associated with group 0. Therefore, output logic 130 is in communication with 120a, 220a, and 320a. Similarly, the group 1 output logic 230 is in communication with memory elements 120b, 220b and 320b, and the group 2 output logic 330 is in communication with memory elements 120c, 220c, and 320c.

The output logic 130 schedules the transmission of packets for each output port in its group. For example, using the mechanism described above, it locates the next packet destined for output port 0 in each of the associated memory elements 120a, 220a and 320a. Based on a scheduling algorithm, it selects one of these packets and transmits it via output port 0. The output logic 130 then repeats this for output ports 1 through 3, before returning to output port 0 and repeating the entire cycle again. Since the output logic must supply packets to all four output ports simultaneously, it must operate at a speed at least four times greater than the line rate. Similarly, since a single memory element may be supplying packets for all of the output ports simultaneously, the memory elements must also be able to supply data at least four times greater than the line rate. Thus, when combined with the input requirements, the memory elements must operate at eight times the line rate.

Since each memory element must be four times the amount communicated to the neighboring switches, and there are nine memory elements in this configuration, the total memory space is 36 times the amount communicated to the neighboring switches.

Summarizing, this configuration requires the memory to operate at only eight times the line rate, while a traditional input queued switch requires the memories to operate at 13 times the line rate for a similar 12 port switch. At the same time, the scheduling logic is straightforward, similar in complexity to that of the input queued switch and much simpler than the CIOQ switch. To achieve these design parameters, the memory elements are about three times larger than would be in a traditional input queued switch.

While this particular example shows the configuration of a 12-port switch, where there are an equal number of input and output ports, the invention is not so limited. The teachings of this invention can be applied to switches of various sizes and configurations.

In the above description, it is assumed that each switch communicates to each of its neighbors an amount of memory space, M, that is available for that neighbor to use. This amount can be the total available memory space, or optionally can be further divided into classes of service. As described above, in this scenario, the total memory space required per port logic is X*Y*M. However, since there are Y input ports and each can send packets that consume a memory space of M, the actual amount of utilized memory space is only Y*M. In other words, this architecture requires that the memory elements for a given port logic block must be able to store X times as much data than can actually be transmitted to it, since the switch cannot predetermine which memory group the incoming packets are destined for and therefore must maximally size each of the memory elements.

Alternatively, the switch can communicate the amount of memory space that is available to each of its neighbors based on the output port which the incoming packet will use. In other words, the switch can communicate to its neighbor that it has an available amount of memory space, M', for packets that are destined for its output port 0. Similarly, communications can be performed to inform the neighboring switches of the available memory space for each of the other output ports. In this way, the total memory space per port logic is given by:

(the total number of output ports)*M'*(the number of ports in the port group) or Y*Y*X*M'.

In one embodiment, M' is defined as M/(X*Y), so that the total number of memory that is made available to the neighboring switch remains constant. In this embodiment, the total memory space is defined as:

Y*Y*X*M', or Y*M.

This approach reduces the overall size of the memory to that used by the Input Queued switch.

Other possible credit systems can be employed to achieve a similar improvement in memory utilization and the above description should not be construed to limiting the invention to only this embodiment.

What is claimed:

1. A switching device comprising:
   a first memory element associated with a first plurality of output ports, wherein the first memory element includes shared storage configured to store packets received by ones of a first plurality of input ports that are destined to any of the first plurality of output ports;
   a second memory element associated with a second plurality of output ports, wherein the second memory element includes shared storage configured to store packets received by ones of the first plurality of input ports that are destined to any of the second plurality of output ports; and
   a first router configured to route first and second packets respectively received by first and second given ones of the first plurality of input ports to the first memory element in response to determinations that the received first and second packets specify destinations corresponding to a same one of the first plurality of output ports; and
   wherein the first router is configured to route third and fourth packets respectively received by the first and second given ones of the first plurality of input ports to the second memory element in response to determinations that the received third and fourth packets specify destinations corresponding to a same one of the second plurality of output ports.

2. The switching device as recited in claim 1 further comprising a first output logic circuit coupled to receive packets stored in the first memory element and configured to transmit each such packet to a particular output port of the first plurality of output ports depending upon the packet's destination.

3. The switching device as recited in claim 1 wherein the received first and second packets specify destinations that are the same.

4. The switching device as recited in claim 1 further comprising:
   a third memory element associated with the first plurality of output ports, wherein the third memory element includes shared storage configured to store packets received by ones of a second plurality of input ports that are destined to any of the first plurality of output ports;
   a fourth memory element associated with the second plurality of output ports, wherein the fourth memory element includes shared storage configured to store packets received by ones of the second plurality of input ports that are destined to any of the second plurality of output ports; and
   a second router configured to route selected packets received by one or more of the second plurality of input ports to the third memory element for buffering in response to determining that the selected packets specify a destination corresponding to one or more of the first plurality of output ports and configured to route additional packets received by one or more of the second plurality of input ports to the fourth memory element for buffering in response to determining that the additional packets specify a destination corresponding to one or more of the second plurality of output ports.

5. The switching device as recited in claim 1 further comprising a mechanism configured for use by the first memory element to track packets destined to any output port of the first plurality of output ports.

6. The switching device as recited in claim 1 wherein the first router is configured to route a multicast packet received at any of the first plurality of input ports to the first memory element and to the second memory element simultaneously, based on the destination output ports specified by the multicast packet.

7. The switching device as recited in claim 1 wherein the first router is configured to route the packets received by any of the first plurality of input ports to the first memory element by time multiplexing.

8. The switching device as recited in claim 2 further comprising a second output logic circuit coupled to receive packets stored in the second memory element and configured to transmit each such packet to a particular output port of the second plurality of output ports depending upon the packet's destination.

9. The switching device as recited in claim 2 wherein the first output logic circuit is configured to route packets stored in the first memory element to selected output ports of the first plurality of output ports by time multiplexing.

10. The switching device as recited in claim 4 further comprising a first output logic circuit coupled to receive packets stored in the first and third memory elements and configured to transmit each such packet to a particular output port of the first plurality of output ports depending upon the packet's destination.

11. The switching device as recited in claim 5 wherein the mechanism maintains linked lists to track packets that are destined to any each output port of the first plurality of output ports.

12. The switching device as recited in claim 10 further comprising a second output logic circuit coupled to receive packets stored in the second and fourth memory elements and configured to transmit each such packet to a particular output port of the second plurality of output ports depending upon the packet's destination.

13. A switching network comprising:
a plurality of packet source devices;
a plurality of packet destination devices;
a plurality of switching devices coupled between the plurality of packet source devices and the plurality of packet destination devices, wherein each switching device includes:
a first memory element associated with a first plurality of output ports, wherein the first memory element includes shared storage configured to store packets received by ones of a first plurality of input ports that are destined to any of the first plurality of output ports;
a second memory element associated with a second plurality of output ports, wherein the second memory element includes shared storage configured to store packets received by ones of the first plurality of input ports that are destined to any of the second plurality of output ports; and
a first router configured to route first and second packets respectively received by first and second given ones of the first plurality of input ports to the first memory element in response to determinations that the received first and second packets specify destinations corresponding to a same one of the first plurality of output ports; and
wherein the first router is configured to route third and fourth packets respectively received by the first and second given ones of the first plurality of input ports to the second memory element in response to determinations that the received third and fourth packets specify destinations corresponding to a same one of the second plurality of output ports.

14. The switching network as recited in claim 13 wherein each switching device further includes a first output logic circuit coupled to receive packets stored in the first memory element and configured to transmit each such packet to a particular output port of the first plurality of output ports depending upon the packet's destination.

15. The switching network as recited in claim 14 wherein each switching device further includes a second output logic circuit coupled to receive packets stored in the second memory element and configured to transmit each such packet to a particular output port of the second plurality of output ports depending upon the packet's destination.

16. The switching network as recited in claim 14 wherein the first output logic circuit of each switching device is configured to route packets stored in the first memory element to selected output ports of the first plurality of output ports by time multiplexing.

17. The switching network as recited in claim 14 wherein the shared storage of the first memory element of each switching device is configured to store packets received by each of the first plurality of input ports that are destined to any output port of the first plurality of output ports.

18. A switching device comprising:
a plurality of output port groups, wherein each output port group includes a plurality of corresponding output ports;
a plurality of input port groups, wherein each input port group includes a plurality of corresponding input ports;
wherein, for any given input port group of the plurality of input port groups, the switching device further includes:
a respective plurality of memory elements, wherein a separate respective memory element is provided that corresponds to each output port group of the plurality of output port groups and that includes shared storage configured to store packets received by each of the corresponding input ports of the given input port group that are destined to the corresponding output port group; and
a respective router configured, for each packet received by any of the corresponding input ports of the given input port group, to determine a particular destination of the packet and to route the packet to the separate respective memory element that corresponds to the output port group that includes the output port for the particular destination;
wherein the respective router for a given one of the plurality of input port groups is configured to route first and second packets received at a given input port of the given input port group to a first memory element in response to determinations that the received first and second packets specify destinations corresponding to a same output port of one of the plurality of output port groups.

19. The switching device as recited in claim 18 further comprising a respective output logic circuit corresponding to each respective output port group configured to receive packets stored in the separate respective memory element of each given input port group that corresponds to the respective output port group.

20. The switching device as recited in claim 18 further comprising a respective mechanism corresponding to each respective memory element and configured to track packets destined to any output port of the corresponding output port group.

21. The switching device as recited in claim 18 wherein each respective router is configured to route a multicast packet received at any of the corresponding input ports of the given input port group to more than one of the respective memory elements simultaneously, based on destination output ports specified by the multicast packet.

22. The switching device as recited in claim 18 wherein each respective router is configured to route the packets received by any of the corresponding input ports of the given input port group to one of the separate respective memory elements by time multiplexing.

23. The switching device as recited in claim 19 wherein each respective output logic circuit is configured to route packets to particular output ports by time multiplexing.

24. The switching device as recited in claim 20 wherein each respective mechanism maintains linked lists to track packets that are destined to any output port of the corresponding output port group.

25. A method comprising:
routing a first plurality of packets received at a first plurality of input ports of a switching device to a first memory element associated with a first plurality of output ports of the switching device in response to determining that each of the first plurality of packets specifies a destination corresponding to one or more of the first plurality of output ports, wherein at least two of the first plurality of packets specify destinations corresponding to a same one of the first plurality of output ports, and wherein the first memory element includes shared storage configured to store packets received at ones of the first plurality of input ports that are destined to any of the first plurality of output ports; and routing a second plurality of packets received at the first plurality of input ports to a second memory element associated with a second plurality of output ports of the switching device for buffering in response to determining that each of the second plurality of packets specifies a destination corresponding to one or more of the second plurality of output ports, wherein at least two of the second plurality of packets specify destinations corresponding to a same one of the second plurality of output ports, and wherein the second memory element includes shared storage configured to store packets received at ones of the second plurality of input ports that are destined to any of the second plurality of output ports.

26. The method as recited in claim 25 further comprising transmitting each of the first plurality of packets stored in the first memory element to a particular output port of the first plurality of output ports through an output logic circuit depending upon each packet's destination.

* * * * *

UNITED STATES PATENT AND TRADEMARK OFFICE
CERTIFICATE OF CORRECTION

PATENT NO. : 7,957,275 B2  Page 1 of 1
APPLICATION NO. : 10/937662
DATED : June 7, 2011
INVENTOR(S) : Meier It is certified that error appears in the above-identified patent and that said Letters Patent is hereby corrected as shown below:

Title page, item (56), under "Other Publications", in Column 2, Line 3, delete "Unviersity," and insert -- University, --.

Signed and Sealed this
Fourth Day of October, 2011

David J. Kappos
*Director of the United States Patent and Trademark Office*